(12) United States Patent
Seino

(10) Patent No.: US 8,481,209 B2
(45) Date of Patent: Jul. 9, 2013

(54) ELECTRODE AND BATTERY HAVING THE SAME

(75) Inventor: Hiroshi Seino, Fukushima (JP)

(73) Assignee: Sony Corporation, Tokyo (JP)

( * ) Notice: Subject to any disclaimer, the term of this patent is extended or adjusted under 35 U.S.C. 154(b) by 435 days.

(21) Appl. No.: 12/826,907

(22) Filed: Jun. 30, 2010

(65) Prior Publication Data

US 2011/0003203 A1    Jan. 6, 2011

(30) Foreign Application Priority Data

Jul. 6, 2009  (JP) ................ P2009-159729

(51) Int. Cl.
*H01M 4/13*  (2010.01)
*H01M 4/62*  (2006.01)

(52) U.S. Cl.
USPC ........................................ 429/217

(58) Field of Classification Search
USPC ........................................ 429/217
See application file for complete search history.

(56) References Cited

U.S. PATENT DOCUMENTS

| | | | | |
|---|---|---|---|---|
| 6,372,388 | B1 * | 4/2002 | Katsurao et al. | 429/316 |
| 2002/0119377 | A1 * | 8/2002 | Suzuki et al. | 429/303 |

FOREIGN PATENT DOCUMENTS

| | | |
|---|---|---|
| JP | 3121943 | 10/2000 |
| JP | 3661945 | 4/2005 |
| JP | 3999927 | 8/2007 |
| JP | 2008-098054 | 4/2008 |
| JP | 4363436 | 8/2009 |

* cited by examiner

Primary Examiner — Carlos Barcena
(74) Attorney, Agent, or Firm — K&L Gates LLP

(57) ABSTRACT

An electrode includes: a collector; and an active material layer provided on the collector, containing a copolymer obtained by copolymerizing, as a comonomer, at least one member selected from monomers represented by the following general formulae (1) to (4) with vinylidene fluoride or vinylidene fluoride and a copolymerizable monomer thereof

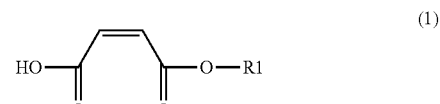 (1)

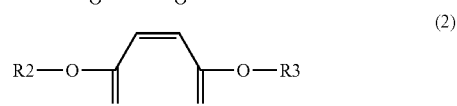

(2)

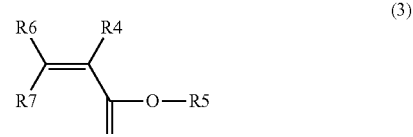

(3)

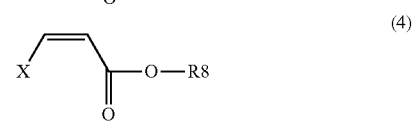

(4)

wherein each of R1 to R3 independently represents a hydrocarbon group having from 4 to 10 carbon atoms; R4 represents a hydrogen atom or a methyl group; each of R6 and R7 independently represents a hydrogen atom or a hydrocarbon group having from 1 to 4 carbon atoms; each of R5 and R8 independently represents a hydrogen atom or a hydrocarbon group having from 4 to 10 carbon atoms; and X represents a cyano group or an aldehyde group.

7 Claims, 2 Drawing Sheets

ELECTRODE AND BATTERY HAVING THE SAME

CROSS REFERENCES TO RELATED APPLICATIONS

The present application claims priority to Japanese Priority Patent Application JP 2009-159729 filed in the Japan Patent Office on Jul. 6, 2009, the entire contents of which is hereby incorporated by reference.

BACKGROUND

The present application relates to a battery. In particular, the present application relates to a nonaqueous electrolyte secondary battery.

In recent years, downsizing and weight reduction of mobile information terminals such as mobile phones, laptop personal computers and PDA are rapidly developing, and batteries as a drive power source thereof are required to realize a higher capacity. Since nonaqueous electrolyte secondary batteries represented by lithium ion secondary batteries have a high energy density and a high capacity, they are widely utilized as a drive power source for the foregoing mobile information terminals. In particular, since laminated batteries using an aluminum laminated film for an exterior are lightweight, they have a large energy density. In laminated batteries, when an electrolytic solution is swollen into a polymer, deformation of the laminated battery can be suppressed, and therefore, laminated polymer batteries are also widely used.

In an electrode of such a battery, an active material bearing an oxidation-reduction reaction is in general carried on a collector by a binder. It is necessary to design the binder such that bonding to the collector as well as bonding to the active material is stably secured with time at use of the battery (see Japanese Patents Nos. 3,121,943, 3,661,945 and 3,999,927).

However, among up-to-date binders, there was included a system in which a cycle performance of the battery drops because separation between the binder and the active material or separation between the collector and the binder is caused due to expansion/contraction of the active material.

In lithium ion secondary batteries, especially under the cycle, the binder cannot follow the expansion/contraction of the active material, and adhesion between the collector and the active material layer is lowered. Therefore, there was involved such a problem that not only electrical conductivity is lowered, but a cycle performance is lowered.

SUMMARY

It is desirable to provide an electrode capable of enhancing a cycle performance and a battery using the same.

(1) According to an embodiment, there is provided an electrode including a collector and an active material layer provided on the collector, containing a copolymer obtained by copolymerizing, as a comonomer, at least one member selected from monomers represented by the following general formulae (1) to (4) with vinylidene fluoride or vinylidene fluoride and a copolymerizable monomer thereof.

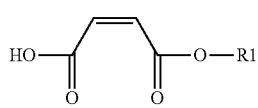

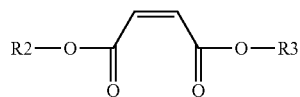

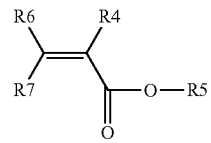

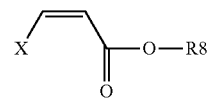

In the foregoing formulae, each of R1 to R3 independently represents a hydrocarbon group having from 4 to 10 carbon atoms; R4 represents a hydrogen atom or a methyl group; each of R6 and R7 independently represents a hydrogen atom or a hydrocarbon group having from 1 to 4 carbon atoms; each of R5 and R8 independently represents a hydrogen atom or a hydrocarbon group having from 4 to 10 carbon atoms; and X represents a cyano group or an aldehyde group.

(2) According to another embodiment, there is provided a battery having the electrode as set forth above in (1).

In the embodiments according to the present application, the electrode as referred to herein means either one or both of a negative electrode and a positive electrode. Also, in the case where a negative electrode is concerned, the collector is also referred to as "negative electrode collector", and the active material (layer) is also referred to as "negative electrode active material (layer)". In the case where a positive electrode is concerned, the collector is also referred to as "positive electrode collector", and the active material (layer) is also referred to as "positive electrode active material (layer)". The copolymer can be used for both of the positive electrode and the negative electrode. Since the effects are exhibited regardless of the kind of an electrolytic solution of the battery, both a solid electrolyte in a gel form and a liquid electrolyte can be similarly used.

In view of the fact that the battery according to the embodiment has an electrode using a specified binder, a cycle performance can be enhanced.

Also, since this binder is able to enhance a peel strength against the collector, a use amount thereof may be made smaller than that of up-to-date binders, leading to realization of a higher capacity of the battery.

Furthermore, the nonaqueous electrolyte battery according to the embodiment of the application, which is able to enhance such a cycle performance, increases the capacity and largely contributes to development of the industry regarding portable electronic appliances.

Additional features and advantages are described herein, and will be apparent from the following Detailed Description and the figures.

DETAILED DESCRIPTION

Figure 1:
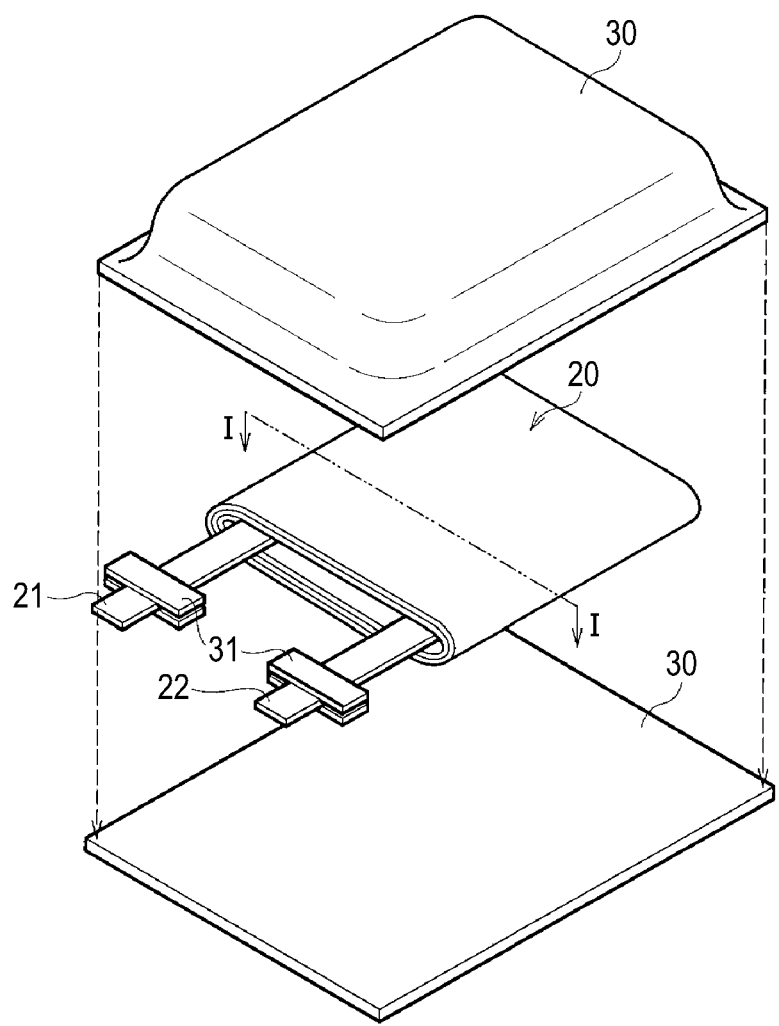
FIG. 1 is a view schematically showing a configuration of a secondary battery according to an embodiment.

The present application will be described below referring to the drawings according to an embodiment. However, the examples described below are not limitative, and various numerical values and materials in the following examples are shown merely as exemplary ones. Incidentally, the description will be made in the following order:

The binder which is used in the embodiment according to the present application is described.

The binder which is used in the embodiment according to the present application contains at least the foregoing copolymer. First of all, this copolymer is described.

The compound represented by the general formula (1) is hereinafter also referred to as "monomer (1)". The same is also applicable to other general formulae (2) to (4). Also, vinylidene fluoride or vinylidene fluoride and a copolymerizable monomer thereof are also referred to as "copolymer main component".

The copolymer which is used in the embodiment according to the present application is one obtained by copolymerizing at least one member selected from the group consisting of the monomers (1) to (4) with the copolymer main component. The monomers (1) to (4) can be used singly or in combinations of two or more thereof. Also, monomers represented by the same general formula and having a different substituent from each other can be used. Also, even when the copolymer is any of a block copolymer or a random copolymer, the same effects can be exhibited. However, in order to contrive to make a binding force uniform upon dispersing the copolymer, the copolymer is desirably a random copolymer. In order to increase flexibility as a molecule, it is more preferable that the copolymer main component is present in both sides of the comonomer.

In the monomer (1) or (2), each of R1 to R3 independently represents a hydrocarbon group having from 4 to 10 carbon atoms, and preferably from 4 to 8 carbon atoms. The hydrocarbon group may be linear, branched or cyclic and may be saturated or unsaturated. By making the carbon atom number of the hydrocarbon group fall within the foregoing range, the copolymer is made soft, and a free volume is increased. Therefore, a strong adhesive strength is exhibited, and a binding force between the active material and the collector as well as a binding force between the active materials each other is increased. Also, by making the carbon atom number of the hydrocarbon group fall within the foregoing range, since the copolymer becomes three-dimensionally bulky, crystallization of the copolymer main component or packing between the molecules can be prevented from occurring. For that reason, the molecule becomes soft, whereby the copolymer has flexibility; and entanglement with an adherend is increased, whereby the binding force increases. In view of the fact that the binding force increases, an amount of the binder necessary for revealing a certain peel strength against the collector becomes small. According to this, there is brought an advantage that the capacity of the battery can be increased.

When the carbon atom number of the hydrocarbon group is not more than 3, bulkiness is small so that it may be impossible to bring an effect for imparting flexibility to the molecule or an effect for suppressing ester hydrolysis. On the other hand, when the carbon atom number of the hydrocarbon group exceeds 10, bulkiness becomes too large, and therefore, an action for hindering the polymerization with the copolymer main component is exhibited so that it may be impossible to synthesize a copolymer.

In the monomer (1), namely a maleic monoester, since the carboxyl group and the ester group containing R1 are adjacent to each other, there was exhibited an action in which the carboxyl group serves as a catalyst to hydrolyze the adjacent ester group. When the carbon atom number of R1 is less than the range according to the embodiment, there was involved such a disadvantage that it is difficult to hinder a motion of the carboxyl group, thereby making it easy to cause hydrolysis. However, when the carbon atom number of R1 falls within the range according to the embodiment, the bulkiness increases, and an effect for hindering a free motion of the carboxyl group is brought. For that reason, the catalytic effect of the carboxyl group is hindered, and the hydrolysis of the ester group is suppressed. By suppressing the hydrolysis of the ester group, a change in composition of the copolymer to be caused due to the hydrolysis of the ester group during the cycle is reduced, whereby a binder performance is stabilized.

The carboxyl group of maleic acid is strong in an interaction with an active material or a metal foil, and a binding property to the active material or metal foil is increased by this interaction. Therefore, it is preferable that the monomer (1) is contained as the comonomer component of the copolymer according to the embodiment.

In each of R1 to R3, examples of the hydrocarbon group include a linear alkyl group, for example, a butyl group, a propyl group, a pentyl group, a decyl group, etc. So far as a butyl group is concerned as an example, the same effects are exhibited even in structural isomers of a branched structure inclusive of an n-butyl group, an isobutyl group, a sec-butyl group and a t-butyl group. A 2-ethylhexyl group is also used for an acrylic pressure-sensitive adhesive, and its effect for enhancing a binding force is high. Each of R1 to R3 includes not only the foregoing alkyl group but an alkenyl group and an alkynyl group. Though a polyunsaturated hydrocarbon group can also be used, it is preferable that the unsaturation number is not so much large. This is because rotation of the molecule is hindered in an unsaturated group moiety, and steric hindrance is weakened. For each of R1 to R3, in addition to the linear hydrocarbon group, a cyclic hydrocarbon group can also be used because of its bulkiness. Examples thereof include a cyclobutyl group, a cyclopentyl group, a cyclohexyl group, an adamantyl group, a norbornyl group, a phenyl group and a naphthyl group.

Next, the monomer (3) is described.

R4 represents a hydrogen atom or a methyl group; each of R6 and R7 independently represents a hydrogen atom or a hydrocarbon group having from 1 to 4 carbon atoms; and R5 represents a hydrogen atom or a hydrocarbon group having from 4 to 10 carbon atoms.

In each of R6 and R7, the hydrocarbon group having from 1 to 4 carbon atoms may be linear, branched or cyclic, and though it may be saturated or unsaturated, it is preferably saturated. The reason why the carbon atom number of the hydrocarbon group is regulated to the foregoing range resides in the fact that a glass transition point of the copolymer is not made excessively low. R6 or R7 is preferably a hydrogen atom or a methyl group. In R5, the hydrocarbon group is synonymous with that in R1. R5 is preferably a hydrogen atom or a hydrocarbon group having from 4 to 10 carbon atoms.

Examples of the monomer (3) include acrylic acid, methacrylic acid, alkyl acrylates and alkyl methacrylates.

Next, the monomer (4) is described.

In R8, the hydrocarbon group is synonymous with that in R1. R8 is preferably a hydrogen atom or a hydrocarbon group having from 4 to 10 carbon atoms.

It is preferable that the copolymer main component of the copolymer which is used in the embodiment according to the present application is contained in an amount of 90% by mass or more relative to the copolymer. It is preferable that at least one member selected from the group consisting of the monomers (1) to (4) is copolymerized in a proportion of from 0.1% by mole or more and not more than 5% by moles in terms of a total amount in the copolymer. This is because not only it is difficult to raise a copolymerization ratio from the standpoint of polymerizability of the monomers (1) to (4), but there is a concern that when the copolymerization ratio is raised, a polar moiety is increased, and the resulting copolymer is swollen with an electrolytic solution, whereby the peel strength is lowered. The proportion of the monomer or monomers in the copolymer is more preferably from 0.5% by mole to 2% by mole.

In the case where vinylidene fluoride and a copolymerizable monomer are used jointly as the copolymer main component, a material to be used as the copolymerizable monomer is not particularly limited. Examples thereof include fluorinated hydrocarbons, for example, vinyl fluoride, trifluoroethylene, trifluorochloroethylene, tetrafluoroethylene, hexafluoropropylene, fluoroalkyl vinyl ethers, etc. These materials can be used singly or in combinations of two or more kinds thereon in a proportion of not more than 20% by mass in the copolymer main component.

As a synthesis method of the copolymer, the same method as a usual synthesis method of polyvinylidene fluoride is applicable, and examples thereof include radical polymerization inclusive of suspension polymerization or emulsion polymerization.

After the copolymer synthesis, as an analysis method of its structure, the structure can be confirmed by means of infrared (IR) spectral measurement or measurement by $^1$H-NMR, $^{13}$C-NMR or the like.

Though the copolymer which is used in the embodiment according to the present application is used as a binder of the electrode, the copolymer may be used singly as this binder, or the copolymer may be used jointly with other known binder. In the latter case, a proportion of the copolymer is preferably 20% by mass or more of the total amount of the binders.

The battery according to the embodiment has the electrode according to the embodiment. In general, the battery includes a nonaqueous electrolyte composition together with a positive electrode and a negative electrode. The nonaqueous electrolyte composition contains a solvent and an electrolyte salt.

(Solvent)

The solvent which is used for the electrolytic solution is preferably a high-dielectric constant solvent having a dielectric constant of 30 or more. This is because according to this, the number of lithium ions can be increased.

Examples of the high-dielectric constant solvent include cyclic carbonates such as ethylene carbonate and propylene carbonate; lactones such as γ-butyrolactone and γ-valerolactone; lactams such as N-methyl-2-pyrrolidone; cyclic carbamates such as N-methyl-2-oxazolidinone; and sulfone compounds such as tetramethylene sulfone. Of these, cyclic carbonates are preferable, and ethylene carbonate is especially preferable. A content of the high-dielectric constant solvent in the electrolytic solution is preferably in the range of 15% or more and not more than 50%. Also, the high-dielectric constant solvent may be used singly or in admixture of plural kinds thereof.

It is preferable that the solvent used for the electrolytic solution is used upon mixing the high-dielectric constant solvent with a low-viscosity solvent whose viscosity is not more than 1 mPa·s. This is because according to this, higher ionic conductivity can be obtained. A ratio (mass ratio) of the low-density solvent relative to the high-dielectric constant solvent is preferably in the range of from 2/8 to 5/5 in terms of a (high-dielectric constant solvent)/(low-viscosity solvent) ratio. This is because when the ratio of the low-viscosity solvent relative to the high-dielectric constant solvent falls within this range, higher effects can be obtained.

Examples of the low-viscosity solvent include chain carbonates such as dimethyl carbonate, diethyl carbonate, ethyl methyl carbonate and methyl propyl carbonate; chain carboxylates such as methyl acetate, ethyl acetate, methyl propionate, ethyl propionate, methyl butyrate, methyl isobutyrate, methyl trimethylacetate and ethyl trimethylacetate; chain amides such as N,N-dimethylacetamide; chain carbamates such as methyl N,N-diethylcarbamate and ethyl N,N-diethylcarbamate; and ethers such as 1,2-dimethoxyethane, tetrahydrofuran, tetrahydropyrane and 1,3-dioxolane. Such a low-viscosity solvent may be used singly or in admixture of plural kinds thereof.

(Electrolyte Salt)

Examples of the electrolyte salt include inorganic lithium salts such as lithium hexafluorophosphate (LiPF$_6$), lithium tetrafluoroborate (LiBF$_4$), lithium hexafluoroarsenate (LiAsF$_6$), lithium hexafluoroantimonate (LiSbF$_6$), lithium perchlorate (LiClO$_4$) and lithium tetrachloroaluminate (LiAlCl$_4$); and lithium salts of perfluoroalkanesulfonic acid derivatives such as lithium trifluoromethanesulfonate (CF$_3$SO$_3$Li), lithium bis(trifluoromethanesulfone)imide [(CF$_3$SO$_2$)$_2$NLi], lithium bis(pentafluoroethanesulfone)imide [(C$_2$F$_5$SO$_2$)$_2$NLi] and lithium tris(trifluoromethanesulfone)methide [(CF$_3$SO$_2$)$_3$CLi]. The electrolyte salt may be used singly or in admixture of plural kinds thereof.

(Polymer Compound)

The nonaqueous electrolyte composition according to the embodiment can contain a polymer compound which is swollen with the electrolytic solution to serve as a holding body for holding the electrolytic solution. According to this, the electrolytic solution is held by the polymer compound, and the electrolytic solution and the polymer compound are integrated to form an electrolyte in a gel form. In the case of forming an electrolyte in a gel form, the nonaqueous electrolyte composition in the nonaqueous electrolyte secondary battery according to the embodiment is able to contrive to suppress blister at the time of high-temperature storage.

In the embodiment according to the present application, in the case where the polymer compound is used upon being added to the electrolytic solution, a content of the polymer compound in the electrolytic solution is preferably in the range of 0.1% by mass or more and not more than 10% by mass relative to the electrolytic solution. Also, in the case where the polymer compound is used upon being coated on the both surfaces of the separator, a mass ratio of the electrolytic solution to the polymer compound is preferably in the range of from 50/1 to 10/1.

As the polymer compound, polyvinylidene fluoride (PVDF) having a degree of polymerization of from 100 to 10,000 or its copolymer can be used. The copolymer of polyvinylidene fluoride is a copolymer of vinylidene fluoride (VDF) and other monomer, and examples thereof include a copolymer of vinylidene fluoride and hexafluoropropylene (HFP) and a copolymer of vinylidene fluoride and chlorotrifluoroethylene.

Examples of other polymer compounds than the foregoing polyvinylidene fluoride or its copolymer include ether based polymer compounds having a degree of polymerization of from 100 to 10,000 inclusive of polyvinyl formal, polyethylene oxide and a crosslinked material containing polyethylene oxide; ester based polymer compounds having a degree of polymerization of from 100 to 10,000 inclusive of polymethacrylates; and acrylate based polymer compounds having a degree of polymerization of from 100 to 10,000. The polymer compound may be used singly or in admixture of plural kinds thereof.

Best modes for carrying out the embodiments according to the present application are hereunder described with reference to the accompanying drawings, but it should not be construed that the present application is limited to the following modes.

FIG. 1 schematically shows a configuration of a secondary battery according to the embodiment. This secondary battery is of a so-called laminated film type and is one in which a wound electrode body 20 having a positive electrode lead 21 and a negative electrode lead 22 installed therein is housed in the inside of an exterior member 30 in a film form.

Each of the positive electrode lead 21 and the negative electrode lead 22 is led out in, for example, the same direction from the inside toward the outside of the exterior member 30. Each of the positive electrode lead 21 and the negative electrode lead 22 is made of a metal material, for example, aluminum, copper, nickel, stainless steel, etc. and shaped in a thin plate form or network form.

Figure 2:
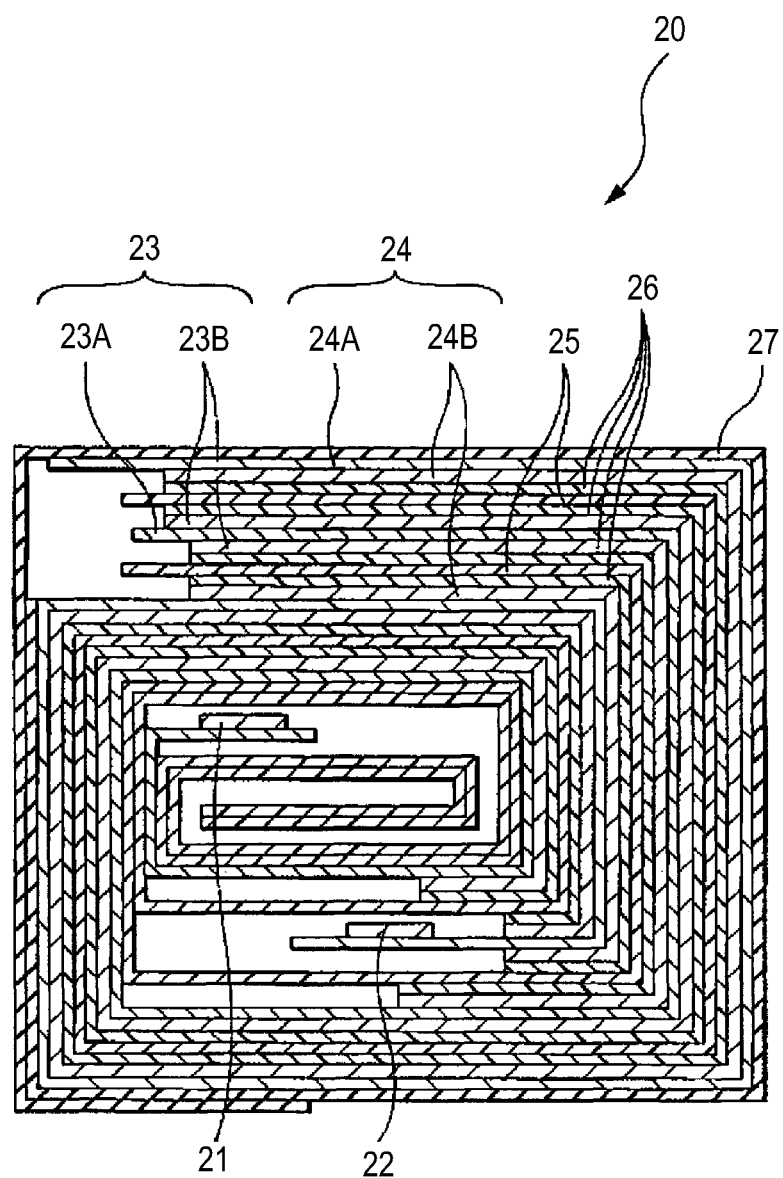
FIG. 2 is a sectional view showing enlargedly a part of a wound electrode body in the secondary battery shown in FIG. 1.

FIG. 2 shows a sectional structure along an I-I line of the wound electrode body 20 shown in FIG. 1. The wound electrode body 20 is one prepared by laminating a positive electrode 23 and a negative electrode 24 via a separator 25 and an electrolyte layer 26 and winding the laminate, and an outermost peripheral part thereof is protected by a protective tape 27.

(Positive Electrode)

The positive electrode 23 has a structure in which a positive electrode active material layer 23B is provided on the both surfaces of a positive electrode collector 23A. The positive electrode collector 23A is made of a metal material, for example, aluminum, nickel, stainless steel, etc. The positive electrode active material layer 23B contains, as a positive electrode active material, one or plural kinds of a positive electrode material capable of intercalating and deintercalating lithium, and it may further contain a conductive agent such as carbon materials and a binder, if desired. As the binder, though the foregoing copolymer can be used, a binder other than the copolymer may be used.

As the positive electrode material capable of intercalating and deintercalating lithium, for example, lithium complex oxides such as lithium cobaltate, lithium nickelate and solid solutions thereof ($Li_x(NiCO_yMn_z)O_2$) (values of x, y and z are satisfied with the relationships of ($0<x<1$), ($0<y<1$), ($0\leq z<1$) and ($x+y+z$)=1, respectively), and manganese spinel ($LiMn_2O_4$) and solid solutions thereof ($Li(Mn_{2-v}Ni_v)O_4$) (a value of v is satisfied with the relationship of $v<2$); and phosphate compounds having an olivine structure, such as lithium iron phosphate ($LiFePO_4$) are preferable. This is because a high energy density can be obtained. Also, examples of the positive electrode material capable of intercalating and deintercalating lithium include oxides such as titanium oxide, vanadium oxide and manganese dioxide; disulfides such as iron disulfide, titanium disulfide and molybdenum sulfide; sulfur; and conductive polymers such as polyaniline and polythiophene.

In the nonaqueous electrolyte secondary battery according to the embodiment, a thickness of the positive electrode active material layer 23B is preferably in the range of 40 µm or more and not more than 80 µm, and more preferably from 40 µm or more and not more than 60 µm per one surface. When the thickness of the positive electrode active material layer 23B is 40 µm or more, it is possible to contrive to realize a high capacity of the battery. Also, when the thickness of the positive electrode active material layer 23B is not more than 80 µm, the nonaqueous electrolyte secondary battery according to the embodiment contributes to an increase of a discharge capacity retention rate at the time of repetition of charge and discharge. Also, it is preferable to coat and dry the positive electrode active material layer 23B so as to have a coverage of from 14 to 30 mg/cm$^2$ per one surface.

(Negative Electrode)

For example, the negative electrode 24 has a structure in which a negative electrode active material layer 24B is provided on the both surfaces of a negative electrode collector 24A having a pair of surfaces opposing to each other, and the negative electrode active material layer 24B and the positive electrode active material layer 23B are disposed opposing to each other. The negative electrode collector 24A is made of a metal material, for example, copper, nickel, stainless steel, etc.

The negative electrode active material layer 24B contains, as a negative electrode active material, one or plural kinds of a negative electrode material capable of intercalating and deintercalating lithium. In this secondary battery, the charge capacity of the negative electrode material capable of intercalating and deintercalating lithium is larger than the charge capacity of the positive electrode 23, and the battery is regulated such that a lithium metal does not deposit on the negative electrode 24 on the way of charge.

Examples of the negative electrode material capable of intercalating and deintercalating lithium include carbon materials, for example, hardly graphitized carbon, easily graphitized carbon, graphite, pyrolytic carbons, cokes, vitreous carbons, organic polymer compound baked materials, carbon fibers, active carbon, etc. Of these, examples of the cokes include pitch coke, needle coke and petroleum coke. The organic polymer compound baked material as referred to herein is a material obtained through carbonization by baking a polymer material such as phenol resins and furan resins at an appropriate temperature, and a part thereof is classified into hardly graphitized carbon or easily graphitized carbon. Also, examples of the polymer material include polyacetylene and polypyrrole. Such a carbon material is preferable because a change in the crystal structure to be generated at the time of charge and discharge is very small, a high charge and discharge capacity can be obtained, and a favorable cycle performance can be obtained. In particular, graphite is preferable because its electrochemical equivalent is large, and a high energy density can be obtained. Also, hardly graphitized carbon is preferable because an excellent performance can be obtained. Moreover, a material having a low charge and discharge potential, specifically one having a charge and discharge potential close to a lithium metal, is preferable because it is easy to realize a high energy density of the battery.

Also, in addition to the foregoing carbon materials, a material containing an element capable of forming an alloy with lithium, such as silicon and tin and compounds thereof, magnesium, aluminum and germanium may be used as the negative electrode material. Furthermore, a material containing an element capable of forming a complex oxide with lithium, such as titanium, may be thought.

In the nonaqueous electrolyte secondary battery according to the embodiment, a thickness of the negative electrode active material layer 24B is preferably in the range of 40 µm or more and not more than 80 and more preferably from 40 µm or more and not more than 60 µm per one surface. When the thickness of the negative electrode active material layer 24B is 40 µm or more, it is possible to contrive to realize a high capacity of the battery. Also, when the thickness of the negative electrode active material layer 24B is not more than 80 µm, the nonaqueous electrolyte secondary battery according to the embodiment contributes to an increase of a discharge capacity retention rate at the time of repetition of charge and discharge. Also, it is preferable to coat and dry the negative electrode active material layer 24B so as to have a coverage of from 7 to 15 mg/cm2 per one surface.

(Separator)

The separator 25 partitions the positive electrode 23 and the negative electrode 24 from each other and allows a lithium ion to pass therethrough while preventing a short circuit of the current to be caused due to the contact of the both electrodes. This separator 25 is made of, for example, a porous film made of a synthetic resin such as polytetrafluoroethylene, polypropylene and polyethylene; or a porous film made of a ceramic. The separator 25 may also have a structure in which plural kinds of those porous films are laminated. The separator 25 is, for example, impregnated with an electrolytic solution which is a liquid electrolyte.

(Exterior Member)

The exterior member 30 is made of, for example, a rectangular aluminum laminated film obtained by sticking a nylon film, an aluminum foil and a polyethylene film in this order. The exterior member 30 is, for example, provided in such a manner that the side of the polyethylene film and the wound electrode body 20 are disposed opposing to each other, and respective outer edges thereof are brought into intimate contact with each other by means of fusion or with an adhesive. A contact film 31 is inserted between the exterior member 30 and each of the positive electrode lead 21 and the negative electrode lead 22 for the purpose of preventing invasion of the outside air. This contact film 31 is made of a material having adhesion to each of the positive electrode lead 21 and the negative electrode lead 22. Examples of such a material include polyolefin resins such as polyethylene, polypropylene, modified polyethylene and modified polypropylene.

The exterior member 30 may be made of a laminated film having other structure, or a polymer film such as polypropylene or a metal film in place of the foregoing aluminum laminated film.

(Manufacturing Method)

In the case of using, for example, a polymer compound, this secondary battery can be manufactured in the following manner.

The positive electrode can be, for example, manufactured in the following manner. First of all, a positive electrode active material, a conductive agent and a binder (which may contain the foregoing copolymer) are mixed to prepare a positive electrode mixture, and this positive electrode mixture is dispersed in a solvent such as N-methyl-2-pyrrolidone to form a positive electrode mixture slurry in a paste form. Subsequently, this positive electrode mixture slurry is coated on the positive electrode collector 23A, and after drying the solvent, the resultant is subjected to compression molding by a roll press or the like, thereby forming the positive electrode active material layer 23B. There is thus prepared the positive electrode 23. On that occasion, the positive electrode active material layer 23B is regulated so as to have a thickness of 40 μm or more.

Also, the negative electrode can be, for example, manufactured in the following manner. First of all, a negative electrode active material containing graphite or at least one of silicon and tin as a constituent element, a conductive agent and a binder (preferably containing the foregoing copolymer) are mixed to prepare a negative electrode mixture, and this negative electrode mixture is dispersed in a solvent such as N-methyl-2-pyrrolidone to form a negative electrode mixture slurry in a paste form. Subsequently, this negative electrode mixture slurry is coated on the negative electrode collector 24A and dried, and the resultant is subjected to compression molding, thereby forming the negative electrode active material layer 24B containing a negative electrode active material particle made of the foregoing negative electrode active material. There is thus obtained the negative electrode 24. On that occasion, the negative electrode active material layer 24B is regulated so as to have a thickness of 40 μm or more.

Subsequently, a precursor solution containing an electrolytic solution, a polymer compound and a mixed solvent is coated on each of the positive electrode 23 and the negative electrode 24, and the mixed solvent is vaporized to form the electrolyte layer 26. Subsequently, the positive electrode lead 21 is installed in the positive electrode collector 23A, and the negative electrode lead 22 is also installed in the negative electrode collector 24A. Subsequently, the positive electrode 23 and the negative electrode 24 each having the electrolyte layer 26 formed thereon are laminated via the separator 25 to form a laminate, this laminate is then wound in a longitudinal direction thereof, and the protective tape 27 is bonded to the outermost peripheral part to form the wound electrode body 20. Thereafter, for example, the wound electrode body 20 is interposed between the exterior members 30, and the outer edges of the exterior members 30 are brought into intimate contact with each other by means of heat fusion, etc., thereby sealing the wound electrode body 20. On that occasion, the contact film 31 is inserted between each of the positive electrode lead 21 and the negative electrode lead 22 and the exterior member 30. According to this, the secondary battery shown in FIGS. 1 and 2 is completed.

This secondary battery may also be prepared in the following manner. In a manner similar to that as described above, the positive electrode 23 and the negative electrode 24 are first prepared; the positive electrode lead 21 and the negative electrode lead 22 are installed in the positive electrode 23 and the negative electrode 24, respectively; the positive electrode 23 and the negative electrode 24 are then laminated via the separator 25 and wound; and the protective tape 27 is bonded to the outermost peripheral part, thereby forming a wound body serving as a precursor of the wound electrode body 20. Subsequently, this wound body is interposed between the exterior members 30, and the outer edges exclusive of one side are heat fused to form the wound body in a bag form, thereby housing it in the inside of the exterior member 30. Subsequently, a composition for electrolyte containing an electrolytic solution and a monomer as a raw material of the polymer compound and optionally other material such as a polymerization initiator or a polymerization inhibitor is prepared and injected into the inside of the exterior member 30. Thereafter, an opening of the exterior member 30 is hermetically sealed by means of heat fusion. Thereafter, the monomer is polymerized upon being optionally heated to form a polymer compound, thereby forming the electrolyte layer 26 in a gel form. There is thus assembled the secondary battery shown in FIGS. 1 and 2.

In this secondary battery, when charged, for example, a lithium ion is deintercalated from the positive electrode 23 and intercalated in the negative electrode 24 via the electrolytic solution. On the contrary, when discharged, for example, a lithium ion is deintercalated from the negative electrode 24 and intercalated in the positive electrode 23 via the electrolytic solution.

While in the foregoing embodiments, the laminated battery has been exemplified as the shape of the battery, needless to say, it should not be construed that the present application is limited to thereto. That is, the present application is also applicable to a cylindrical battery, a rectangular battery and the like.

While the present application has been described by reference to the foregoing embodiments, it should not be construed that the present application is limited to these embodiments, and various changes and modifications can be made therein. For example, while in the foregoing embodiments, the case of using an electrolyte in a gel form having a polymer compound held in an electrolytic solution as well as the case of using an electrolytic solution as an electrolyte have been described, other electrolytes may be used, too. Examples of other electrolytes include a mixture of an electrolytic solution with an ionic conductive inorganic compound such as an ionic conductive ceramic, an ionic conductive glass and an ionic crystal; a mixture of an electrolytic solution with other inorganic compound; and a mixture of an electrolyte in a gel form with such an inorganic compound.

Furthermore, while in the foregoing embodiments, a battery using lithium as an electrode reactant has been described, the present application is also applicable to the case of using other alkali metal, for example, sodium (Na), potassium (K), etc.; an alkaline earth metal, for example, magnesium, calcium (Ca), etc.; or other light metal, for example, aluminum, etc.

Moreover, while in the foregoing embodiments, a so-called lithium ion secondary battery in which the capacity of a negative electrode is expressed by a capacity component due to the intercalation and deintercalation of lithium has been described, the present application is similarly applicable to a so-called lithium metal secondary battery in which a lithium metal is used for a negative electrode active material, and the capacity of a negative electrode is expressed by a capacity component due to deposition and dissolution of lithium; or a secondary battery in which by making the charge capacity of a negative electrode material capable of intercalating and deintercalating lithium smaller than the charge capacity of a positive electrode, the capacity of a negative electrode includes a capacity component due to intercalation and deintercalation of lithium and a capacity component due to deposition and dissolution of lithium and is expressed by the total sum thereof.

EXAMPLES

Examples according to the present application are hereunder described together with Comparative Examples.

Comparative Examples 1-1 to 1-3, Examples 1-1 to 1-9, Examples 2-1 to 2-4 and Examples 3-1 to 3-12

Batteries were prepared on the basis of the following fundamental form and evaluated in the following manners.
<Fundamental Form>
95 parts by mass of lithium cobaltate as a positive electrode active material and 5 parts by mass of a PVDF homopolymer having a weight average molecular weight of about 100,000 were homogenously mixed, to which was then added a solvent, thereby obtaining a positive electrode mixture coating solution. Subsequently, the obtained positive electrode mixture coating solution was uniformly coated on the both surfaces of an aluminum foil and then dried to form a positive electrode active material layer. This was cut in a size of 50 mm×350 mm, thereby preparing a positive electrode.

95 parts by mass of artificial graphite as a negative electrode active material and 5 parts by pass of a binder having a weight average molecular weight of about 100,000 were homogenously mixed, to which was then added a solvent, thereby obtaining a negative electrode mixture coating solution. Subsequently, the obtained negative electrode mixture coating solution was uniformly boated on the both surfaces of a copper foil serving as a negative electrode collector and then dried to form a negative electrode active material layer. This was cut in a shape of 52 mm×370 mm, thereby preparing a negative electrode.

A nonaqueous electrolytic solution was prepared by mixing ethylene carbonate (EC)/propylene carbonate (PC) (mass ratio=5/5) and $LiPF_6$ (0.6 moles/kg).

A separator obtained by coating PVDF containing 6.9% by mass of HFP on the both surfaces of a microporous polyethylene film was prepared.

The positive electrode and the negative electrode were laminated via the foregoing separator and wound, and the laminate was put in a bag made of an aluminum laminated film. The nonaqueous electrolytic solution was injected into this bag, and the bag was then heat fused to prepare a laminate type battery.
<Measurement of Peel Strength>
A tape was stuck onto the surface of the negative electrode active material layer coated on the metal foil and press bonded under a fixed pressure to prepare a specimen. The specimen is cut in a width of 15 mm and subjected to a peeling test at 180° at a drawing rate of 100 mm/min. The tape is drawn to measure a peel strength between the metal foil and the negative electrode active material layer. A value obtained by standardizing an average value from which a value up to a position of 10 mm after starting drawing is eliminated, with an electrode width is defined as the peel strength. The condition is made by reference to JIS Z0237. A value of 65 mN/mm or more is regarded as "good".
<Structural Change Rate>
A content of an ester group is calculated from an integral ratio of $CH_2$ of VDF in the binder and an integral ratio of C—H of an ester group in a $^1$H-NMR chart, and the content of the ester group before and after the cycle evaluation is compared. How much proportion (% by mole) of the ester group has been hydrolyzed is calculated.
<Discharge Capacity Retention Rate>
After repetition of charge and discharge of constant-current constant-voltage charge of 4.2 V-0.8 A and constant-current discharge of 0.8 A-3 V, a {(capacity at the time of 500 cycles)/(capacity at the time of 5 cycles)} ratio (%) was determined. A value of 75% or more is regarded as "good".

Comparative Examples 1-1 to 1-3 and Examples 1-1 to 1-9

In the fundamental form, the specification of the binder of the negative electrode active material layer was changed as follows. Also, the specification and the evaluation results are shown in Table 1.

Comparative Example 1-1

A PVDF homopolymer was used as the binder.

Comparative Example 1-2

A copolymer of VDF and monomethyl maleate was used as the binder. A content (% by mol relative to the copolymer) of monomethyl maleate is shown in Table 1. Though this monomer has the same structure as the monomer (1) according to the embodiment, the carbon atom number of the substituent (R1) is smaller than the lower limit in the embodiment according to the present application (the same is also applicable to Comparative Example 1-3).

Comparative Example 1-3

A copolymer of VDF and monoethyl maleate was used as the binder.

Examples 1-1 to 1-9

Each of copolymers prepared by changing the copolymerization ratio of VDF and mono-n-butyl maleate as shown in Table 1 was used as the binder. In this copolymer, the substituent R1 of the monomer (1) is an n-butyl group whose carbon atom number is 4.

TABLE 1

| | Binder | | | | Peel strength mN/mm | Discharge capacity retention rate % | Peel strength after cycle mN/mm | Structural change rate % by mol |
|---|---|---|---|---|---|---|---|---|
| | Addition amount in negative electrode % by mass | Comonomer | | | | | | |
| | | Kind | Content % by mol | Substituent (R1) | | | | |
| Comparative Example 1-1 | 5.0 | | 0 | | 46 | 68 | 26 | 0.0 |
| Comparative Example 1-2 | 5.0 | Monomer (1) | 1.0 | Methyl group | 70 | 76 | 30 | 12.1 |
| Comparative Example 1-3 | 5.0 | Monomer (1) | 1.0 | Ethyl group | 73 | 76 | 32 | 11.5 |
| Example 1-1 | 5.0 | Monomer (1) | 0.05 | n-Butyl group | 74 | 77 | 35 | 4.8 |
| Example 1-2 | 5.0 | Monomer (1) | 0.1 | n-Butyl group | 83 | 82 | 50 | 4.2 |
| Example 1-3 | 5.0 | Monomer (1) | 0.2 | n-Butyl group | 87 | 84 | 62 | 4.3 |
| Example 1-4 | 5.0 | Monomer (1) | 0.5 | n-Butyl group | 103 | 87 | 78 | 4.2 |
| Example 1-5 | 5.0 | Monomer (1) | 1.0 | n-Butyl group | 119 | 88 | 89 | 4.0 |
| Example 1-6 | 5.0 | Monomer (1) | 2.0 | n-Butyl group | 152 | 87 | 119 | 3.9 |
| Example 1-7 | 5.0 | Monomer (1) | 3.0 | n-Butyl group | 183 | 88 | 135 | 4.3 |
| Example 1-8 | 5.0 | Monomer (1) | 5.0 | n-Butyl group | 200 | 88 | 160 | 3.8 |
| Example 1-9 | 5.0 | Monomer (1) | 6.0 | n-Butyl group | 221 | 89 | 174 | 3.7 |

As is clear from the foregoing Table 1, in the Examples, by increasing the copolymerization ratio of the maleate, the peel strength was increased, and the cycle performance was enhanced. In the Comparative Examples, it is understood that the structural change rate is high; and that the cycle performance and the peel strength are not improved in view of comparison with those in Example 1-5. This is caused due to a difference of the comonomer.

Examples 2-1 to 2-4

The addition amount of the binder in the negative electrode was changed on the basis of Example 1-5. The obtained results are shown in Table 2.

TABLE 2

| | Binder | | | | Peel strength mN/mm | Discharge capacity retention rate % | Peel strength after cycle mN/mm | Structural change rate % by mol |
|---|---|---|---|---|---|---|---|---|
| | Addition amount in negative electrode % by mass | Comonomer | | | | | | |
| | | Kind | Content % by mol | Substituent (R1) | | | | |
| Comparative Example 1-1 | 5.0 | | 0 | | 46 | 68 | 26 | 0.0 |
| Comparative Example 1-2 | 5.0 | Monomer (1) | 1.0 | Methyl group | 70 | 76 | 30 | 12.1 |
| Comparative Example 1-3 | 5.0 | Monomer (1) | 1.0 | Ethyl group | 73 | 76 | 32 | 11.5 |
| Example 2-1 | 1.0 | Monomer (1) | 1.0 | n-Butyl group | 26 | 57 | 10 | 4.3 |
| Example 2-2 | 2.0 | Monomer (1) | 1.0 | n-Butyl group | 55 | 74 | 33 | 4.2 |
| Example 2-3 | 3.0 | Monomer (1) | 1.0 | n-Butyl group | 78 | 85 | 50 | 4.0 |
| Example 2-4 | 4.0 | Monomer (1) | 1.0 | n-Butyl group | 99 | 88 | 77 | 4.1 |
| Example 1-5 | 5.0 | Monomer (1) | 1.0 | n-Butyl group | 119 | 88 | 89 | 4.0 |

As is clear from the foregoing Table 2, by making the bulkiness of the substituent of the maleate large, even when the use amount of the binder was decreased, the peel strength could be increased while keeping the cycle performance. There may be a possibility that when the composition of the active material layer is changed, a high peel strength is exhibited with a smaller amount.

Examples 3-1 to 3-12

The substituent of the comonomer or the kind of the comonomer was changed on the basis of Example 1-5. The obtained results are shown in Table 3.

to an effect in which the softening point of the polymer was lowered by the bulkiness of the ester group.

When the carboxyl group is present as in the monomer (1), the binding force to the metal foil is raised. However, in the comonomers of Examples 3-7 to 3-13, since the carboxyl group is not present, the peel strength is rather low. Since the cyano group and the formyl group are high in polarity, the peel strength is relatively high.

In the comonomers of Examples 3-7 to 3-13, since the carboxyl group is not present, ester hydrolysis to be caused due to a catalytic effect by a carboxyl group does not occur, whereby the ester group becomes stable. Since the cyano

TABLE 3

| | Binder | | | | Peel strength mN/mm | Discharge capacity retention rate % | Peel strength after cycle mN/mm | Structural change rate % by mol |
|---|---|---|---|---|---|---|---|---|
| | Addition amount in negative electrode % by mass | Kind | Comonomer Content % by mol | Substituent | | | | |
| Comparative Example 1-1 | 5.0 | | 0 | | 46 | 68 | 26 | 0.0 |
| Comparative Example 1-2 | 5.0 | Monomer (1) | 1.0 | Methyl group | 70 | 76 | 30 | 12.1 |
| Comparative Example 1-3 | 5.0 | Monomer (1) | 1.0 | Ethyl group | 73 | 76 | 32 | 11.5 |
| Example 1-5 | 5.0 | Monomer (1) | 1.0 | n-Butyl group | 119 | 88 | 89 | 4.0 |
| Example 3-1 | 5.0 | Monomer (1) | 1.0 | Isobutyl (2-methylpropyl) group | 136 | 88 | 107 | 3.7 |
| Example 3-2 | 5.0 | Monomer (1) | 1.0 | n-Hexyl group | 160 | 88 | 128 | 3.1 |
| Example 3-3 | 5.0 | Monomer (1) | 1.0 | 2-Ethylhexyl group | 173 | 87 | 146 | 2.8 |
| Example 3-4 | 5.0 | Monomer (1) | 1.0 | Adamantyl group | 111 | 84 | 84 | 2.3 |
| Example 3-5 | 5.0 | Monomer (1) | 1.0 | Phenyl group | 130 | 85 | 99 | 2.4 |
| Example 3-6 | 5.0 | Monomer (2) | 1.0 | Di-n-butyl group | 87 | 83 | 58 | 0.7 |
| Example 3-7 | 5.0 | Monomer (3) | 1.0 | n-Butyl group (R5), H (R4, R5 and R7) | 82 | 80 | 51 | 0.5 |
| Example 3-8 | 5.0 | Monomer (3) | 1.0 | n-Octyl group (R5), H (R4, R5 and R7) | 90 | 81 | 60 | 0.4 |
| Example 3-9 | 5.0 | Monomer (3) | 1.0 | 2-Ethylhexyl group (R5), H (R4, R5 and R7) | 93 | 82 | 62 | 0.4 |
| Example 3-10 | 5.0 | Monomer (3) | 1.0 | n-Butyl group (R5), methyl group (R4), H (R5 and R7) | 85 | 80 | 55 | 0.5 |
| Example 3-11 | 5.0 | Monomer (4) | 1.0 | β-Cyano group (X), n-butyl group (R8) | 103 | 85 | 79 | 2.2 |
| Example 3-12 | 5.0 | Monomer (4) | 1.0 | β-Formyl group (X), n-butyl group (R8) | 98 | 84 | 71 | 1.1 |

From the foregoing Table 3, the following can be understood.

The structural change rate varies depending upon the steric hindrance of the ester group of the copolymer, and as shown in Example 3-4, the larger the steric hindrance (the larger the carbon atom number of the substituent), the smaller the structural change rate is.

With respect to the peel strength, when the composition in which a softening point of the binder (copolymer) becomes low is introduced, the peel strength becomes large, and the peel strength after the cycle is kept. As compared with the ester groups (i.e., a methyl group and an ethyl group) of Comparative Examples 1-2 and 1-3, when the carbon atom number of the substituent is 4 or more, an effect for largely enhancing the peel strength was exhibited. This is caused due group and the formyl group are high in polarity, a catalytic effect is slightly revealed, whereby the ester group is hydrolyzed.

Example 4-1 and Comparative Example 4-1

A battery of Example 4-1 was prepared in the same manner as in Example 1-5, except that in Example 1-5, the binder used for the negative electrode was used for the positive electrode, while using the PVDF homopolymer of Comparative Example 1-1 as the binder for the negative electrode. In Comparative Example 4-1, a battery was prepared in the same manner as in Example 4-1, except that in the positive electrode of Example 4-1, monomethyl maleate was used in place of the mono-n-butyl maleate. The obtained results are shown in Table 4.

TABLE 4

| | Electrode | Binder Addition amount % by mass | Comonomer Kind | Comonomer Content % by mol | Comonomer Substituent (R1) | Peel strength mN/mm | Discharge capacity retention rate % | Peel strength after cycle mN/mm | Structural change rate % by mol |
|---|---|---|---|---|---|---|---|---|---|
| Comparative Example 1-1 | Negative electrode | 5.0 | PVDF homopolymer | | | 46 | 68 | 26 | 0.0 |
| | Positive electrode | 5.0 | PVDF homopolymer | | | | | | |
| Example 1-5 | Negative electrode | 5.0 | Monomer (1) | 1.0 | n-Butyl group | 119 | 88 | 89 | 4.0 |
| | Positive electrode | 5.0 | PVDF homopolymer | | | | | | |
| Comparative Example 1-2 | Negative electrode | 5.0 | Monomer (1) | 1.0 | Methyl group | 70 | 76 | 30 | 12.1 |
| | Positive electrode | 5.0 | PVDF homopolymer | | | | | | |
| Example 4-1 | Negative electrode | 5.0 | PVDF homopolymer | | | | 86 | 55 | 7.2 |
| | Positive electrode | 5.0 | Monomer (1) | 1.0 | n-Butyl group | 80 | | | |
| Comparative Example 4-1 | Negative electrode | 5.0 | PVDF homopolymer | | | | 66 | 26 | 20.3 |
| | Positive electrode | 5.0 | Monomer (1) | 1.0 | Methyl group | 57 | | | |

From the foregoing Table 4, the following can be understood.

The effect for enhancing a binding force to a metal foil by the carboxyl group is also revealed in the aluminum foil, and the effect for enhancing a binding force between the positive electrode active materials is also revealed.

In the positive electrode, the binder which is used in the embodiment according to the present application also exhibits the same effects as those in the negative electrode; however, the effects in the negative electrode are larger than those in the positive electrode.

In the positive electrode, the structural change rate is higher than that in the negative electrode due to influences of the active material. This is because the active material serves as a catalyst to promote the hydrolysis. However, in Example 4-1 using mono-n-butyl maleate, the structural change rate is largely decreased as compared with that in Comparative Example 4-1 regarding the system having monomethyl maleate added thereto. The effect for suppressing the hydrolysis to be brought by introducing a bulky ester group is also observed in the positive electrode similar to the negative electrode.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An electrode comprising:

a collector; and an active material layer provided on the collector, containing a copolymer obtained by copolymerizing a comonomer with a copolymer main component, wherein the comonomer is at least one member selected from monomers represented by the following general formulae (1) to (4)

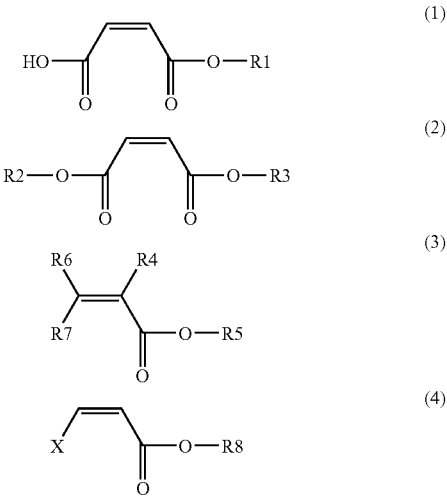

wherein
each of R1 to R3 independently represents a hydrocarbon group having from 4 to 10 carbon atoms;
R4 represents a hydrogen atom or a methyl group;
each of R6 and R7 independently represents a hydrogen atom or a hydrocarbon group having from 1 to 4 carbon atoms;
each of R5 and R8 independently represents a hydrogen atom or a hydrocarbon group having from 4 to 10 carbon atoms; and
X represents a cyano group or an aldehyde group, and
wherein the copolymer main component is selected from the group consisting of: (1) vinylidene fluoride and (2) vinylidene fluoride and a copolymerizable monomer thereof and
wherein in the copolymer, the copolymer main component is present on both sides of the comonomer.

2. The electrode according to claim 1, wherein the comonomer is copolymerized in a proportion of from 0.1% by mole or more and not more than 5% by mole in the copolymer.

3. The electrode according to claim 1, wherein the copolymer contains the compound represented by the general formula (1).

4. The electrode according to claim 1, wherein the copolymer main component is present in an amount of 90% by mass or more relative to the copolymer.

5. The electrode according to claim 1, wherein the copolymerizable monomer is at least one selected from the group consisting of vinyl fluoride, trifluoroethylene, trifluorochloroethylene, tetrafluoroethylene, hexafluoropropylene and a fluoroalkyl vinyl ether.

6. The electrode according to claim 1, wherein the comonomer is mono-n-butyl maleate.

7. A battery including the electrode according to claim 1.

* * * * *